Sept. 15, 1942.   E. E. MILLER   2,295,678
MUD PUMP PISTON
Filed March 17, 1941

Inventor
ERWIN E. MILLER
By Hazard and Miller
Attorneys

Patented Sept. 15, 1942

2,295,678

UNITED STATES PATENT OFFICE 2,295,678

MUD PUMP PISTON

Erwin E. Miller, Fullerton, Calif.

Application March 17, 1941, Serial No. 383,745

1 Claim. (Cl. 309—4)

This invention relates to improvements in mud pump pistons, and may be regarded as a further development of the invention disclosed in my copending application Serial No. 321,061, filed February 27, 1940.

In the above-mentioned application I have disclosed a mud pump piston formed of a one-piece body which fills the major portion of the cross-sectional area of the cylinder of the mud pump in which the piston is to be installed. On the periphery of this body there is a central flange of sufficient external diameter as to substantially fit against the cylinder walls afforded by the mud pump liner. On both sides of the central flange there are a series of small perforated flanges and rubber or similar material is molded around and between these flanges and through the perforations therein. The rubber provides flexible lips at the ends of the piston and provides cylinder-wall engaging surfaces of the piston on opposite sides of the central flange.

The central flange on the body which engaged the cylinder walls afforded by the mud pump liner was heretofore regarded as being necessarily present when the piston was subjected to high pressure conditions in that it prevented the rubber from being forced longitudinally around the body of the piston. Its presence was known to be objectionable in that there was a tendency for the rubber to be squeezed around the edge of the central flange during reciprocation of the piston so that adjacent the flange the rubber in the course of time became chewed away and sometimes loosened therefrom. Although such objections were present the presence of the flange was thought to be required in order to keep the major portion of the rubber in place. Other objections to the central flange were that if sand worked between the flange and the liner scoring of the liner was apt to occur.

I have found that the central flange on the piston can be omitted entirely in a mud pump piston of this character and that a highly successful piston can be produced which can be used under extremely high pressures if the body of the piston is made adequately large so as to have a relatively thin layer of rubber on its exterior which is adequately anchored to the body of the piston. In this way the exterior of the rubber forms the entire cylinder-wall engaging surface of the piston and eliminates the chewing away of rubber adjacent the central flange, the loosening of the rubber adjacent the central flange, and the danger of scoring. The layer of rubber on the exterior of the piston must not only be adequately anchored to the body of the piston but must be relatively thin as compared with the size of the piston body so that no large mass of rubber is present on which the high pressures can become effective to materially distort it and loosen it from the body of the piston.

With the foregoing and other objects in view, which will be made manifest in the following detailed description and specifically pointed out in the appended claim, reference is had to the accompanying drawing for an illustrative embodiment of the invention, wherein:

Figure 1:
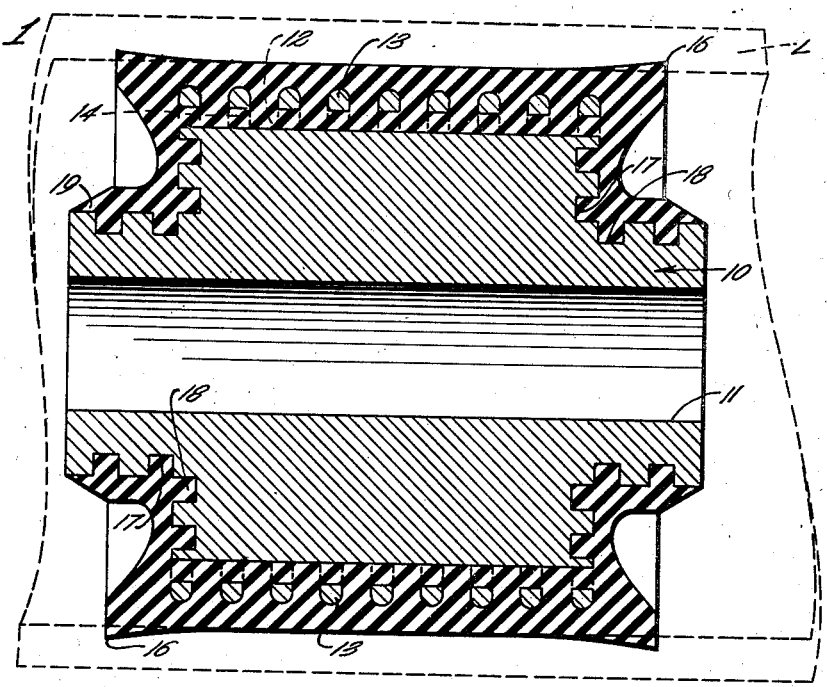
Figure 1 is a vertical section through the improved mud pump piston embodying the present invention illustrated as positioned within a mud pump liner, the liner being indicated by dotted lines.
Figure 3:
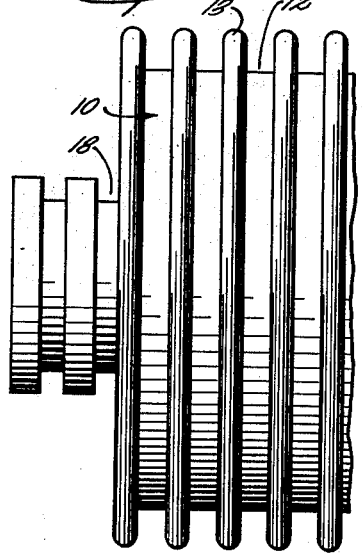
Fig. 3 is a partial view in side elevation of the body of the piston.
Figure 2:
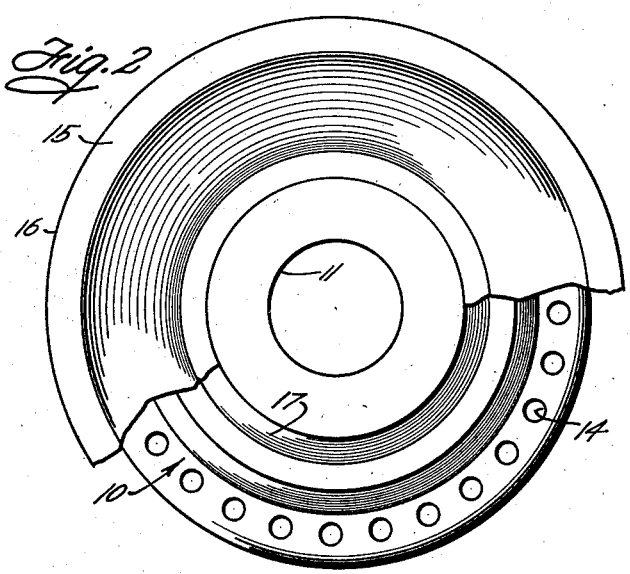
Fig. 2 is a view in end elevation of the piston shown in Fig. 1, parts of the rubber being shown as having been removed.

Referring to the accompanying drawing wherein similar reference characters designate similar parts throughout, the improved piston comprises a one-piece body 10 which may be formed of steel or other metal. This body has a longitudinal bore 11 therethrough which may be either cylindrical as shown, or tapered, depending upon the construction of the piston rod of the pump in which the piston is to be installed.

The body 10 occupies the major portion of the cross-sectional area of the cylinder the walls of which are provided by the conventional liner indicated in dotted lines at L. The body 10 is of generally cylindrical form and has a series of substantially equally spaced grooves 12 turned or otherwise formed therein defining a series of substantially equally spaced flanges 13. These flanges are relatively shallow as compared with the diameter of the piston body. They are longitudinally perforated as indicated by the aligned perforations 14. Rubber or similar composition indicated at 15 is molded around these flanges and between them and in the perforations 14 after which it is vulcanized or cured directly to the body.

As will be noted from an inspection of Fig. 1, the rubber forms the entire cylinder-wall engaging surface of the piston. At the ends of the piston the rubber may be flared outwardly to provide lips 16 which are somewhat flexible and which are designed to wipe closely against the cylinder walls. These lips normally expand outwardly but on insertion of the piston into the liner they must be contracted slightly from the positions shown.

On the end faces of the piston there are preferably formed or cut grooves 17 and 18 disposed at right angles to each other in which the end portions of the rubber are molded. If desired the rubber may be extended out over the hubs of the piston as indicated at 19 and if desired, additional grooves may be cut in the end faces and on the hubs into which the rubber extends. The rubber extending into the groove on the end faces of the hubs serves to provide an effective seal to prevent leakage between the rubber and the body of the piston and helps to hold the rubber from detachment from the body.

The success of a piston of this character under high pressure conditions is somewhat dependent upon the thickness of the rubber layer externally of the peripheries of the flanges 13. This thickness should be relatively small as compared with the diameter of the piston so that no large mass of rubber will be present between the body of the piston and the liner L on which the high pressures may become effective. Thus for example, in a piston having an external diameter of 4⅝" the thickness of the rubber between the flanges 13 and the liner L should be approximately ¼". The rubber might be thinner or might be slightly thicker, but these proportions have proven quite satisfactory.

The flanges 13 on such a piston may be about 3/16" thick and the grooves 12 approximately ¼" wide and 5/16" deep. The perforations 14 on such a piston should be quite numerous. I find that a suitable size and spacing of these perforations on a 4⅝" piston is to have the perforations approximately 3/16" in diameter spaced from each other on ⅜" centers. These perforations may be formed by drilling longitudinally of the piston through the flanges. The drilling may be performed through the flanges from both ends of the piston and it is desirable to have those perforations formed in the flanges from one end disaligned or out of registry with those perforations that are drilled through the flanges from the other end of the piston. The proportions given have proven highly satisfactory for a piston of approximately 4⅝" in diameter. Manifestly with other sizes of pistons the proportions may be altered accordingly.

From the above-described construction it will be appreciated that the piston can be very easily and quickly manufactured. The bodies of the pistons can be cast into the general shape shown and very little machine work other than the drilling of the perforations 14 and the reaming of bore 11 is required. The rubber used is of a uniform composition so as to bring about the desired elasticity and flexibility. In other words it is not necessary to employ two or more compositions of rubber which when vulcanized produce hard and soft rubber on the piston. By the omission of the central flange on the body 10 danger of the rubber becoming loosened adjacent the flange or its being chewed off adjacent the flange, and danger of scoring is entirely eliminated, and by keeping the rubber layer exteriorly of the flanges 13 relatively thin the function of the central flange can be dispensed with entirely.

Various changes may be made in the details of construction without departing from the spirit or scope of the invention as defined by the appended claim.

I claim:

A mud pump piston comprising a one-piece body having on its periphery a multiplicity of substantially equally spaced flanges of substantially the same depth, said flanges and the spaces therebetween occupying substantially the entire external surface of the body of the piston from the end to end thereof, rubber or the like molded around and between the flanges, the rubber forming the entire cylinder-wall engaging surfaces of the piston and externally of the flanges being relatively thin as compared with the diameter of the piston, the flanges being perforated with aligned perforations and the rubber extending into the perforations so as to be effectively anchored thereto.

ERWIN E. MILLER.